United States Patent
Ostino et al.

(10) Patent No.: US 11,199,100 B2
(45) Date of Patent: Dec. 14, 2021

(54) TURBOMACHINE BLADE WITH TRAILING EDGE HAVING IMPROVED COOLING

(71) Applicant: SAFRAN AIRCRAFT ENGINES, Paris (FR)

(72) Inventors: Léandre Ostino, Moissy-Cramayel (FR); Vianney Simon, Moissy-Cramayel (FR); Vincent Keciyan, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/874,788

(22) Filed: May 15, 2020

(65) Prior Publication Data
US 2020/0362705 A1    Nov. 19, 2020

(30) Foreign Application Priority Data

May 17, 2019 (FR) ...................................... 1905205

(51) Int. Cl.
*F01D 5/18* (2006.01)

(52) U.S. Cl.
CPC ............. *F01D 5/187* (2013.01); *F01D 5/186* (2013.01); *F05D 2260/2212* (2013.01); *F05D 2260/22141* (2013.01)

(58) Field of Classification Search
CPC ...... F01D 5/186; F01D 5/187; F05D 2260/20; F05D 2260/202; F05D 2240/126; F05D 2240/127; F05D 2260/2212; F05D 2260/22141
See application file for complete search history.

(56) References Cited

U.S. PATENT DOCUMENTS

| 5,073,086 | A | * | 12/1991 | Cooper | ................... | F01D 5/187 416/96 R |
| 5,232,343 | A | * | 8/1993 | Butts | ....................... | F01D 5/187 415/115 |
| 6,634,858 | B2 | * | 10/2003 | Roeloffs | ................. | F01D 5/186 29/889.721 |
| 2003/0156943 | A1 | | 8/2003 | Strassberger et al. | | |

(Continued)

FOREIGN PATENT DOCUMENTS

| EP | 1918522 A2 | 5/2008 |
| WO | 0012868 A1 | 3/2000 |

OTHER PUBLICATIONS

Preliminary Search Report issued in French Patent Application No. 1905205 dated Jan. 10, 2020.

*Primary Examiner* — Christopher Verdier
(74) *Attorney, Agent, or Firm* — Pearne & Gordon LLP

(57) ABSTRACT

A turbine blade includes a root and an airfoil extending from a base, through which it is connected to the root, to a tip. The airfoil includes an intrados wall and an extrados wall, connected by a leading edge and by a trailing edge with a cooling circuit. The cooling circuit includes a conduit with a duct and a manifold prolonging this conduit. The conduit collects air from the blade root to supply the duct and the manifold that is located downstream from the duct and that supplies the slits in the trailing edge with air. The duct supplies air to one end of the manifold close to the tip. The manifold is separated from the duct by a partition including a portion close to the tip that is curved to be concave when seen from the trailing edge.

18 Claims, 4 Drawing Sheets

(56) References Cited

U.S. PATENT DOCUMENTS

| | | |
|---|---|---|
| 2006/0133935 A1 | 6/2006 | Papple |
| 2011/0176930 A1* | 7/2011 | Ahmad .................. F01D 5/187 |
| | | 416/97 R |
| 2016/0017806 A1* | 1/2016 | Mongillo ................ F02K 1/822 |
| | | 60/772 |

* cited by examiner

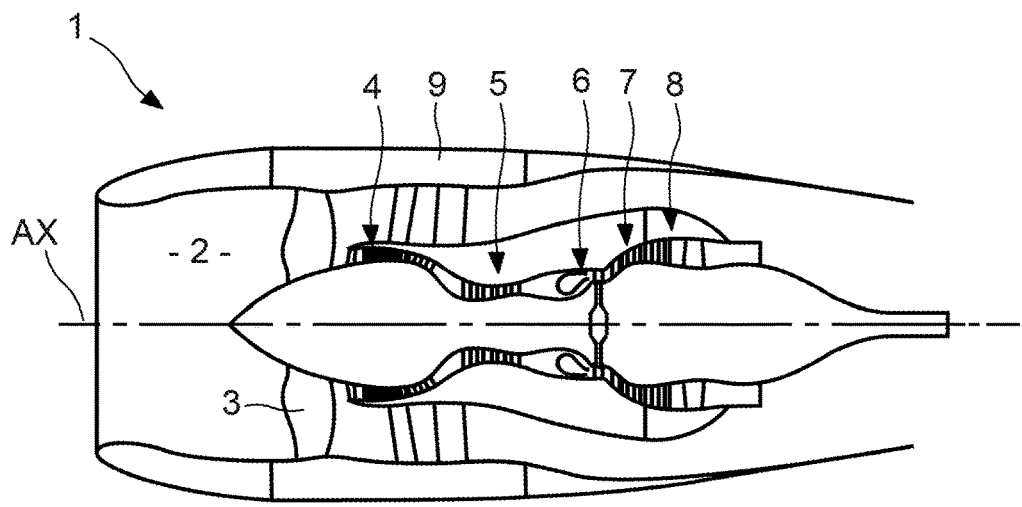
FIG. 1 -- Prior Art --
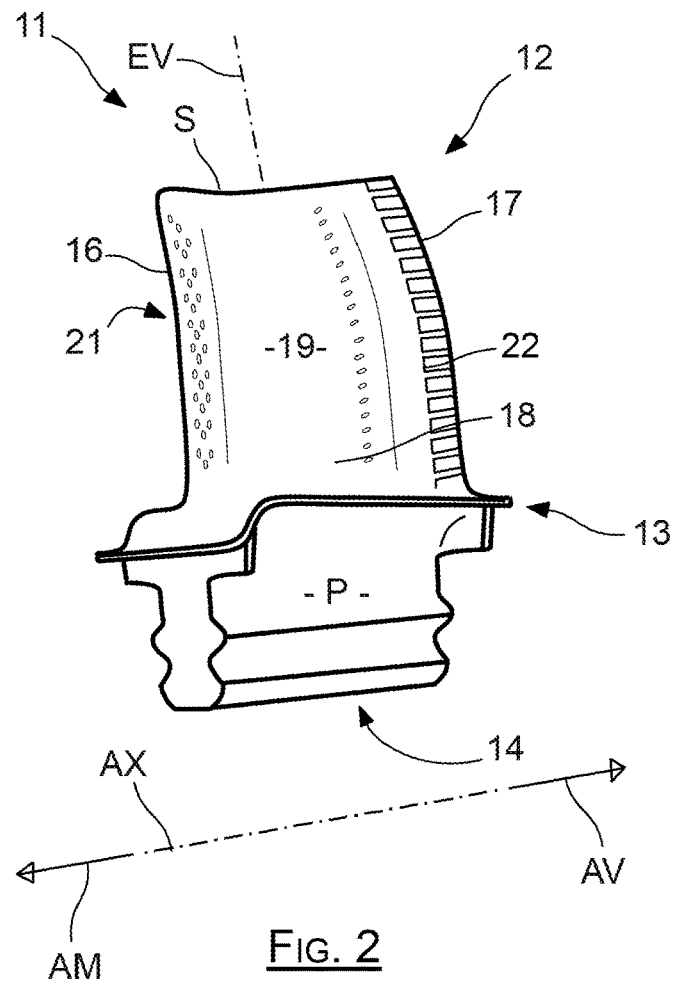
FIG. 2

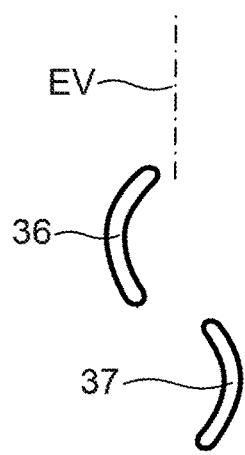 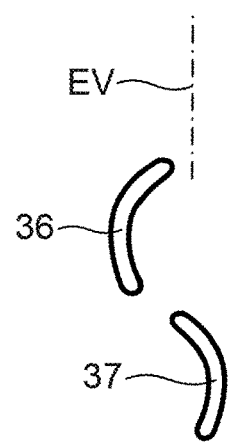 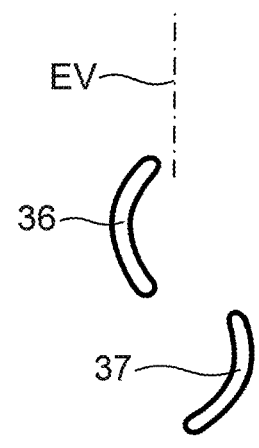
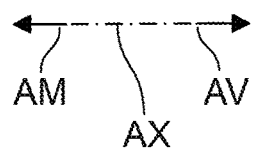 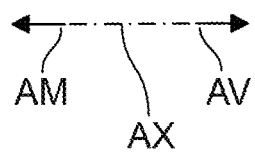 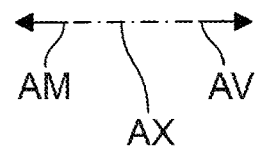
FIG. 7        FIG. 8        FIG. 9
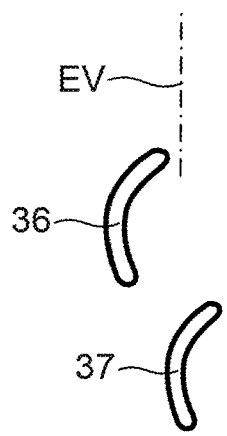 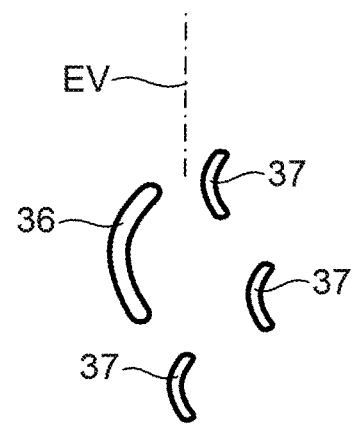
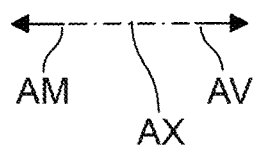 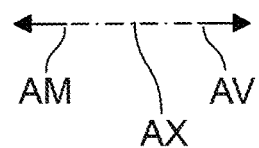
FIG. 10        FIG. 11

TURBOMACHINE BLADE WITH TRAILING EDGE HAVING IMPROVED COOLING

TECHNICAL FIELD

The invention relates to a blade of a turbomachine type aircraft engine, for example such as a turbojet or a turboprop, and is particularly applicable to a high pressure type blade.

STATE OF PRIOR ART

In such a turbojet type engine marked 1 in FIG. 1, air is drawn in through an intake duct 2 to pass through a fan comprising a series of rotating airfoils 3 before being split into a central core flow and a bypass flow surrounding the core flow.

The core flow is compressed by the low pressure compressor 4 and the high pressure compressor 5 before reaching a combustion chamber 6, and it then expands as it passes through a high pressure turbine 7 and a low pressure turbine 8, before being evacuated generating an auxiliary thrust. The bypass flow is propelled directly by the fan to generate a principal thrust.

Each turbine 7, 8 comprises series of blades oriented in the radial direction and uniformly spaced around a rotation axis AX, with an external case 9 surrounding the blades.

The turbine blades are cooled by circulating air in each blade, drawn off upstream from the combustion chamber into the blade root, this air being evacuated through drillings passing through the walls of these blades to cool them, and through slits passing through their trailing edge to cool them.

In general, it is found that cooling of the trailing edge is not always sufficiently uniform, such that there are hot spots in some regions of this trailing edge, particularly close to the tip of the blade.

In this context, the purpose of the invention is to provide a new blade design with improved cooling of its trailing edge.

PRESENTATION OF THE INVENTION

To achieve this, the purpose of the invention is a turbine blade for a turbomachine such as a turbojet, comprising a root and an airfoil extending from the root to a tip, the airfoil comprising an intrados wall and an extrados wall, connected by a leading edge and by a trailing edge, this blade comprising a cooling circuit including:
  a conduit collecting air from the blade root to jointly supply a duct and a manifold that extend between the root and the tip, the duct and the manifold being separated from each other by a partition, the duct being connected to the manifold at the tip;
  the manifold being located downstream from the duct and comprising an end close to the root that is supplied through the conduit, and an end close to the tip that is supplied through the duct, this manifold supplying air to cooling slits distributed along the trailing edge between the tip and the root;
  and wherein the manifold is separated from the duct by a partition extending from the intrados wall to the extrados wall, this partition comprising a first portion terminated by an end close to the tip, prolonged by a second portion terminated by an end close to the root, and wherein the shape of this first portion is curved and concave towards the trailing edge.

Due to the curvature of the partition close to the tip, the end of this partition is brought closer to the trailing edge, which limits recirculation in the fluid manifold leading from the duct. The fluid brought in through the duct at the head is thus evacuated through the slits in the trailing edge located at the tip instead of recirculating towards the slits located at mid-height of the trailing edge.

The invention also relates to a blade thus defined, wherein the shape of the second portion of the partition is curved and is convex towards the slits at the tip of the trailing edge.

The invention also relates to a blade thus defined, wherein the radius of curvature of the second portion of the partition is greater than the radius of curvature of the first portion of this partition.

The invention also relates to a blade thus defined, comprising a curved flow disturber located in the manifold facing the first portion of the partition, and extending from the intrados wall to the extrados wall.

The invention also relates to a blade thus defined, wherein the disturber is curved to be concave towards the trailing edge.

The invention also relates to a blade thus defined, comprising another curved flow disturber located facing the second portion and extending from the intrados wall to the extrados wall.

The invention also relates to a blade thus defined, comprising several other curved flow disturbers extending from the intrados wall to the extrados wall.

The invention also relates to a blade thus defined, comprising straight disturbers in the form of reliefs projecting from the internal face of the intrados and/or extrados wall, these disturbers extending in the manifold and/or in the duct.

The invention also relates to a turbine of a turbomachine comprising a blade thus defined.

The invention also relates to a turbomachine, comprising a turbine thus defined.

BRIEF DESCRIPTION OF THE DRAWINGS

FIG. 1 is a sectional view through a known turbojet;

FIG. 2 is an external perspective view of a blade according to the invention;

FIG. 7 is a diagrammatic representation viewed from the intrados side of a first configuration of two through disturbers in the manifold of the blade according to the invention.

FIG. 8 is a diagrammatic representation viewed from the intrados side of a second configuration of two through disturbers in the manifold of the blade according to the invention.

FIG. 9 is a diagrammatic representation viewed from the intrados side of a third configuration of two through disturbers in the manifold of the blade according to the invention.

FIG. 10 is a diagrammatic representation viewed from the intrados side of a fourth configuration of two through disturbers in the manifold of the blade according to the invention.

FIG. 11 is a diagrammatic representation viewed from the intrados side of a fifth configuration comprising four through disturbers in the manifold of the blade according to the invention.

DETAILED DESCRIPTION OF THE INVENTION

Figure 3:
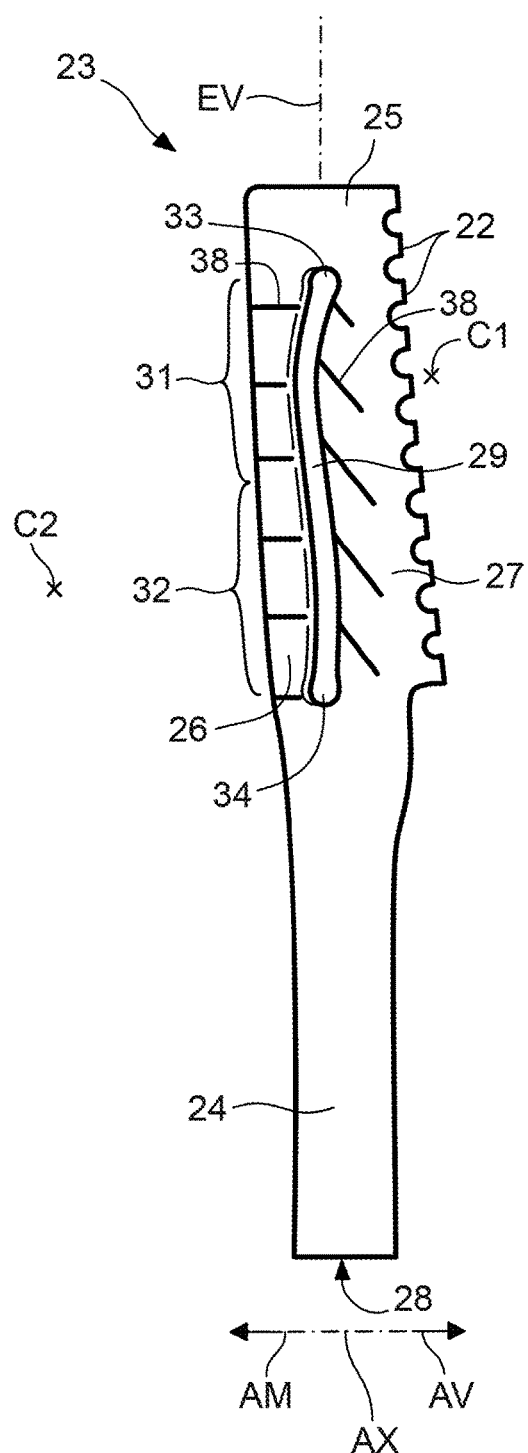
FIG. 3 is a view of the blade cooling circuit according to the invention, represented alone and seen from the intrados side.

The basic concept of the invention is to design a blade wherein air recirculation is reduced to improve cooling of critical areas, particularly at the tip of the blade.

The blade according to the invention marked 11 on FIG. 2 comprises a root P that fixes it to a compartment of a turbine disk, and an airfoil 12 supported by this root P, with a platform 13 connecting the root P to the airfoil 12. This blade 11 comprises internal air circulation circuits carrying air inlet through inlets located on a radially internal face 14 of the root P.

The shape of the airfoil 12 is twisted around a length axis EV approximately perpendicular to a rotation axis AX of the disk carrying the blade, which is a longitudinal axis of the motor. It comprises a leading edge 16 approximately parallel to the length direction EV, located on the upstream AM or forward side of the blade, relative to the direction of gas circulation in the turbomachine. It comprises a trailing edge 17 substantially parallel to the leading edge 16 and at a distance from it along the AX axis to be located on the downstream AV or aft side of the blade. It also comprises a tip S substantially parallel to the base 18 and at a distance from it along the length direction EV.

The two principal walls of this blade are its intrados wall 19, visible in FIG. 2, and its extrados wall 21, that are spaced at intervals from each other along the lateral direction, in other words along a transverse direction that is normal to the EV axis and to the AX axis, these walls coming together at the leading edge 16, at the trailing edge 17 and at the tip S.

The trailing edge 17 is tapered and comprises a series of short cooling slits 22 extending parallel to the length direction EV, spaced at intervals from each other and prolonging each other, and located at a short distance from the terminal edge of the trailing edge. Each slit 22 passes through the intrados wall to blow air on the external face of the intrados wall towards the trailing edge that is provided with external ribs directing this air parallel to the X axis.

This blade is a single-piece blade obtained by casting a metallic material using a set of cores to delimit its internal conduits, these cores being removed after casting and cooling, for example by chemical etching.

The blade 11 comprises several internal circuits, particularly including a circuit 23 dedicated to cooling its trailing edge. FIGS. 3 to 6 show the shape of the core that delimits this circuit 23 when the blade is cast. These figures thus show a shape in relief, but that also forms a representation of the circuit in itself.

As can be seen on FIG. 3, the circuit 23 comprises a conduit 24 oriented along the length direction EV and jointly supplying a duct 26 and a manifold 27 that prolong this conduit 24 extending parallel to each other along the length direction EV, and at a distance from each other along the longitudinal direction AX, the manifold 27 being located downstream from the duct 26.

As can be seen on FIG. 3, the circuit 23 is terminated by a head 25 close to the tip S of the blade, and at which the radial end of the duct 26 is connected to the radial end of the manifold 27. One of the ends of the manifold 27 is thus supplied by the conduit 24 and its radially opposite end is supplied by the duct 26.

The conduit 24 collects air at an inlet 28 located on a terminal face of the root P of the blade, in other words its radially internal face 14.

The manifold 27 is spaced at an interval from the duct 26 along the AX direction, and is separated from it by a separation partition 29. This partition 29 extends laterally from the internal face of the intrados wall 18 to the internal face of the extrados wall 21. This partition 29 comprises a first portion 31 terminated by an end close to the head 25 prolonged by a second portion 32 terminated by another end close to the root P. More particularly, this partition 29 extends along the length direction EV from a first end 33 close to the head 25 and beginning the first portion 31, to a second end 34 located at the base 18 and terminating the second portion 32.

In the examples in the figures, the first end 33 is close to the head 25, and two cooling slots 22 are located along the length direction between this first end 33 and the tip S, in other words facing the head 25 along the axial direction.

Figure 4:
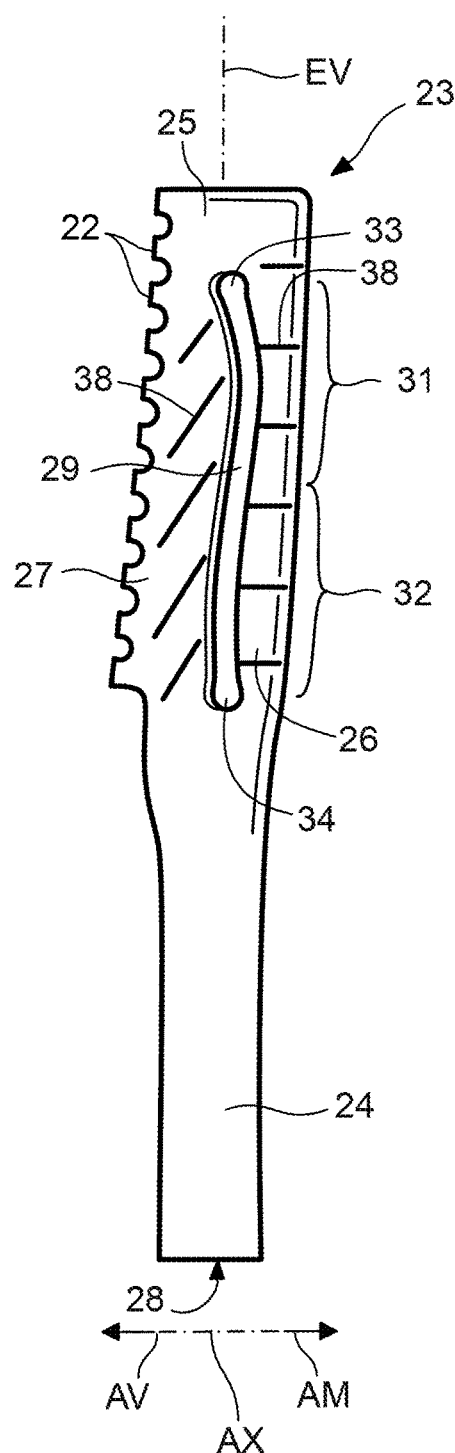
FIG. 4 is a view of the blade cooling circuit according to the invention, represented alone and seen from the extrados side.

As can be seen on FIGS. 3 and 4, the shape of the first portion 31 is curved to be concave when seen from downstream AV, and the shape of the second portion 32 is curved to be convex when seen from downstream AV. Thus, when the circuit 23 is seen from the intrados side as on FIG. 3, the profile of the partition 29 is S-shaped, the S being formed by two opposite curvatures.

The first curvature, in other words the curvature of the first portion 31, is more than the second curvature, in other words the curvature of the second portion 32. Thus, the radius of the first curvature is less than the radius of the second curvature, and the center C1 of the first curvature is located downstream from the partition 29 while the center C2 of the second curvature is upstream from the partition 29.

The first curvature of the partition 29 reduces the distance to the first end of the trailing edge, so as to limit the recirculation of cooling air from the tip of the duct 26 towards the central region of the manifold 27. This significantly increases the air flow through the two or three slits 22 facing the head 25, in other words those closest to the tip S that corresponds to a hot point on the trailing edge. In other words, due to the first curvature, air from the top end of the duct 26 is directed preferably towards the slits 22 close to the tip, instead of being directed towards the other slits 22. The radius of the first curvature of the partition 29 is between 8 and 50 mm The second curvature, namely the curvature of the partition 29 that is closest to the base 18 brings the second end 34 closer to the upstream side AM, so as to adjust the ratio of the air inlet sections of the duct 26 and the manifold 27 if necessary, this air being supplied through the conduit 24. This second curvature can thus significantly increase the inlet section of the manifold 27 and significantly reduce the inlet section of the duct 26. This makes it possible to adjust the flow in the duct 26 and in the manifold 27 to balance cooling of the slits 22 closest to the tip S with the other slits 22. The radius of the second curvature of the partition 29 is substantially more than that of the first curvature. For example, the radius of the second curvature is 5 to 20 times larger than that of the first curvature.

Figure 5:
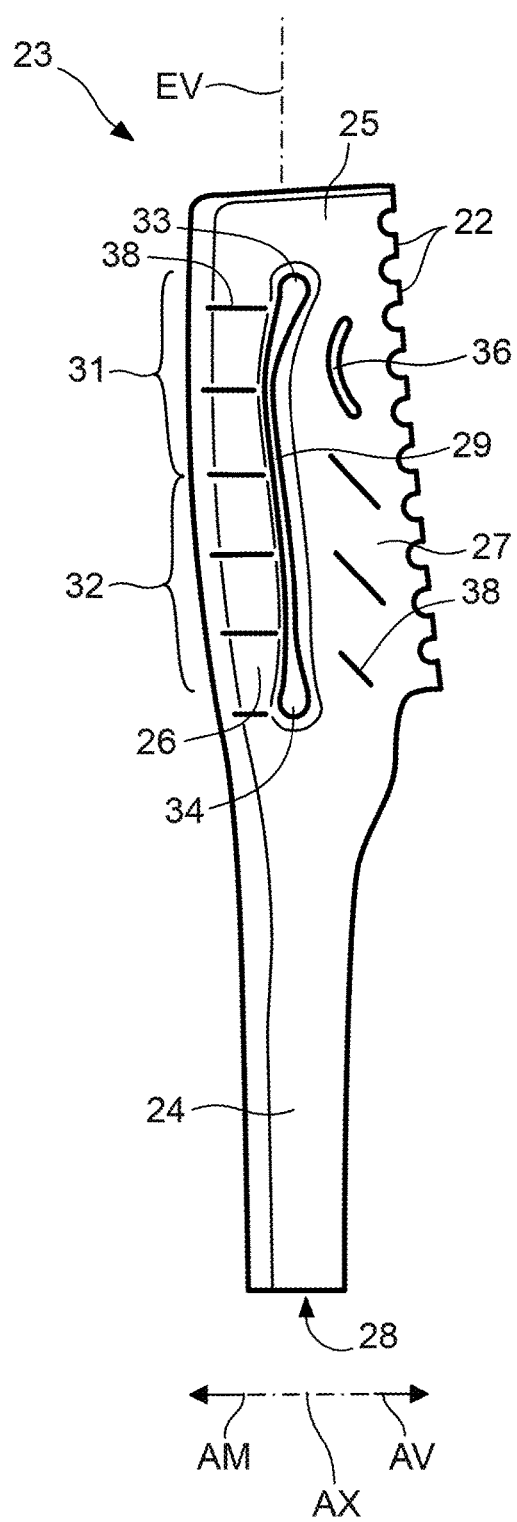
FIG. 5 is a view of the blade cooling circuit according to a variation of the invention, represented alone and seen from the intrados side.
Figure 6:
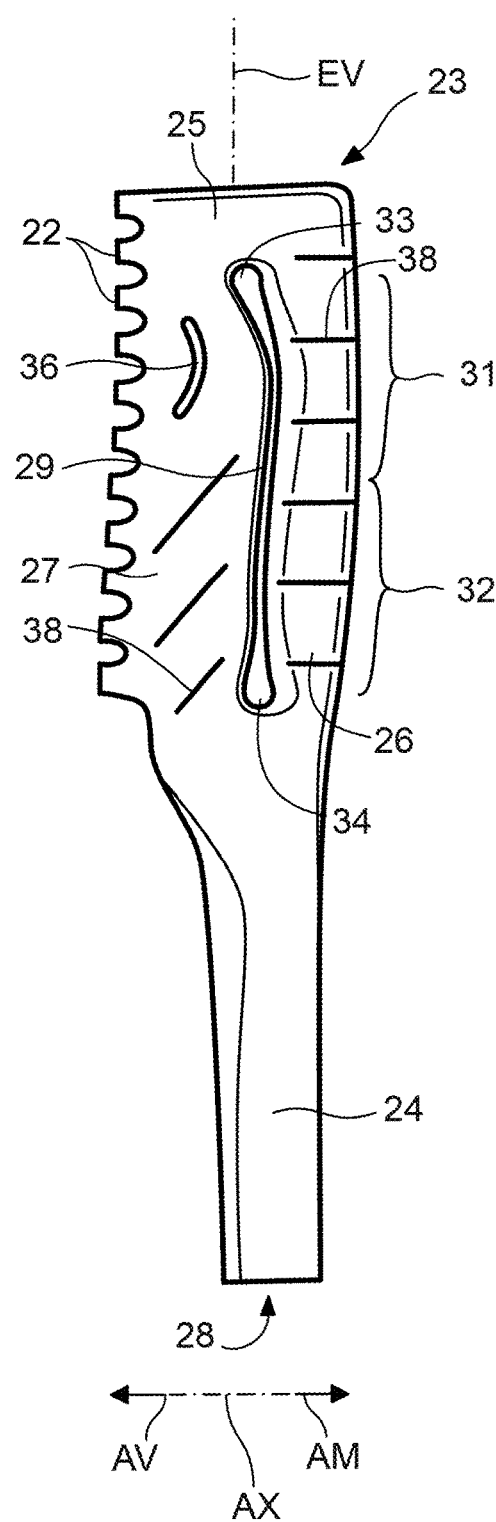
FIG. 6 is a view of the blade cooling circuit according to a variation of the invention, represented alone and seen from the extrados side.

As a variant and as shown on FIGS. 5 and 6, the blade according to the invention also comprises a curved through flow disturber located inside the manifold 27.

This curved disturber marked 36 is a partition located in the manifold 27 facing the first portion 31 and that extends laterally from the intrados wall 19 as far as the extrados wall 21, and that is curved so as to be concave when seen from downstream AV. This disturber is located in the manifold 27 facing the first portion of the partition 29, in other words it is located in the half of the manifold 27 closest to the tip S.

The radius of curvature of this disturber 36 is less than the radius of curvature of the first portion of the partition 29. For example, the radius of curvature of the disturber 36 is between 1 and 10 mm. In general, the radius of curvature of the disturber 36 is 1 to 5 times smaller than that of the first portion of the partition 29. It locally forms an upstream passage in the manifold 27 running alongside the partition 29 and a downstream passage running alongside the slits 22.

Due to its position relatively close to the tip S, this disturber 36 orients a proportion of the air circulating in the manifold 27 along the partition 29 to increase the air flow that will cool the slits 22 facing the head 25, so as to improve cooling of the trailing edge in this part.

Due to its curved shape, this disturber generates flow turbulences that increase heat exchange between the walls and the partitions of the blade and the cooling air transported by the manifold 27, which further improves cooling of the blade close to its tip and its trailing edge. This effect is further improved by the presence of the disturber 36 in the manifold 27, which tends to locally reduce the cross-section of the fluid passage so as to increase its speed, and consequently make the heat exchange more efficient.

Advantageously, another curved flow disturber 37 of the same type as the disturber 36 can be added in the manifold 27, facing the second portion 32 of the partition 29, so as to improve heat exchanges in the manifold 27 close to the trailing edge, to make cooling between the slits 22 closest to the tip and the other slits more uniform.

Several configurations can be envisaged as represented diagrammatically on FIGS. 7 to 10 that illustrate four layouts of the other disturber 37 located in the manifold 27. In the case in FIGS. 7 to 9, this other disturber 27 is curved so as to be concave when seen from upstream AM, and its global orientation relative to the EV direction is different in these three configurations. In the case in FIG. 10, this other disturber 37 is curved and its orientation is the inverse of the orientation of disturber 36, in other words it is concave when seen from downstream AV.

In some cases, the size of the disturber 37 can be different from the size of disturber 26, for example 1 to 3 times smaller. Thus, in the example in FIG. 11, there are three other disturbers 37 that are curved being concave towards the trailing edge. As can be seen on FIGS. 7 to 10 the disturbers 37 are located between the disturber 36 and the trailing edge along the AX axis.

Furthermore, in order to further increase heat exchanges, the different circuits in the blade according to the invention may comprise flow disturbers in the form of straight reliefs formed on the internal face of the intrados wall and the extrados wall, in the channel 26 and in the manifold 27. These disturbers are identified by mark 38 on the figures.

The invention claimed is:

1. A turbine blade for a turbomachine, comprising a root (P) and an airfoil (12) extending from the root (P) to a tip (S), the airfoil (12) comprising an intrados wall (19) and an extrados wall (21), connected by a leading edge (16) and by a trailing edge (17), this blade (11) comprising a cooling circuit (23) including:
   a conduit (24) collecting air from the blade root to jointly supply a duct (26) and a manifold (27) that extend between the root (P) and the tip (S), the duct (26) and the manifold (27) being separated from each other by a partition (29), the duct (26) being connected to the manifold (27) at the tip (S);
   the manifold (27) being located downstream from the duct (26) and comprising an end close to the root (P) that is supplied through the conduit (24), and an end close to the tip (S) that is supplied through the duct (26), this manifold (27) supplying air to cooling slits (22) distributed along the trailing edge (17) between the tip (S) and the root (P);
   wherein the partition (29) delimits and directly separates the duct (26) and manifold (27), the partition (29) extending from the intrados wall (19) to the extrados wall (21) and comprising a first portion (31) terminated by an end close to the tip (S), this first portion being prolonged by a second portion (32) terminated by an end close to the root (P), and wherein the shape of this first portion is curved and concave towards the trailing edge (17).

2. The blade according to claim 1, wherein the shape of the second portion (32) of the partition (29) is curved and is convex towards the trailing edge (17).

3. The blade according to claim 2, wherein the radius of curvature of the second portion (32) of the partition (29) is greater than the radius of curvature of the first portion (31) of this partition (29).

4. The blade according to claim 1, comprising a curved flow disturber (36) located in the manifold (27) facing the first portion (31) of the partition (29), and extending from the intrados wall (19) to the extrados wall (21).

5. The blade according to claim 4, wherein the disturber (36) is curved to be concave towards the trailing edge (17).

6. The blade according to claim 4, comprising another curved flow disturber (37) located facing the second portion (32) and extending from the intrados wall (19) to the extrados wall (21).

7. The blade according to claim 4, comprising several other curved flow disturbers (37) extending from the intrados wall (19) to the extrados wall (21).

8. The blade according to claim 1, comprising straight disturbers (38) in the form of reliefs projecting from an internal face of the intrados and/or the extrados wall, these disturbers extending in the manifold (27) and/or in the duct (26).

9. A turbine comprising the blade according to claim 1.

10. A turbomachine comprising the turbine according to claim 9.

11. The blade according to claim 1, wherein the first portion (31) of the partition (29) is between the duct (26) and manifold (27).

12. The blade according to claim 1, wherein the first portion (31) of the partition (29) has a surface that faces away from the duct (26) and toward the manifold (27), the surface being concave towards the trailing edge (17).

13. The blade according to claim 12, wherein the surface of the first portion (31) is a trailing surface of the partition (29).

14. A turbine blade for a turbojet, comprising a root (P) and an airfoil (12) extending from the root (P) to a tip (S), the airfoil (12) comprising an intrados wall (19) and an extrados wall (21), connected by a leading edge (16) and by a trailing edge (17), this blade (11) comprising a cooling circuit (23) including:
   a conduit (24) collecting air from the blade root to jointly supply a duct (26) and a manifold (27) that extend between the root (P) and the tip (S), the duct (26) and the manifold (27) being separated from each other by a partition (29), the duct (26) being connected to the manifold (27) at the tip (S);

the manifold (27) being located downstream from the duct (26) and comprising an end close to the root (P) that is supplied through the conduit (24), and an end close to the tip (S) that is supplied through the duct (26), this manifold (27) supplying air to cooling slits (22) distributed along the trailing edge (17) between the tip (S) and the root (P);

wherein the partition (29) delimits and directly separates the duct (26) and manifold (27), the partition (29) extending from the intrados wall (19) to the extrados wall (21) and comprising a first portion (31) terminated by an end close to the tip (S), this first portion being prolonged by a second portion (32) terminated by an end close to the root (P), and wherein the shape of this first portion is curved and concave towards the trailing edge (17).

15. A turbine blade for a turbomachine, comprising a root (P) and an airfoil (12) extending from the root (P) to a tip (S), the airfoil (12) comprising an intrados wall (19) and an extrados wall (21), connected by a leading edge (16) and by a trailing edge (17), this blade (11) comprising a cooling circuit (23) including:

a conduit (24) collecting air from the blade root to jointly supply a duct (26) and a manifold (27) that extend between the root (P) and the tip (S), the duct (26) and the manifold (27) being separated from each other by a partition (29), the duct (26) being connected to the manifold (27) at the tip (S);

the manifold (27) being located downstream from the duct (26) and comprising an end close to the root (P) that is supplied through the conduit (24), and an end close to the tip (S) that is supplied through the duct (26), this manifold (27) supplying air to cooling slits (22) distributed along the trailing edge (17) between the tip (S) and the root (P);

wherein the partition (29) extends from the intrados wall (19) to the extrados wall (21) and comprises a first portion (31) between the manifold (27) and duct (26) that is terminated by an end close to the tip (S), this first portion being prolonged by a second portion (32) terminated by an end close to the root (P), and wherein the shape of this first portion is curved and concave towards the trailing edge (17).

16. The blade according to claim 15, wherein the first portion (31) of the partition (29) has a surface that faces away from the duct (26) and toward the manifold (27), the surface being concave towards the trailing edge (17).

17. The blade according to claim 16, wherein the surface of the first portion (31) is a trailing surface of the partition (29).

18. The blade according to claim 15, wherein the first portion (31) delimits and directly separates the duct (26) and manifold (27).

* * * * *